United States Patent
Sullivan

(10) Patent No.: US 9,579,762 B2
(45) Date of Patent: Feb. 28, 2017

(54) DUST FREE DRILL SYSTEM

(71) Applicant: Mark Sullivan, Pompano Beach, FL (US)

(72) Inventor: Mark Sullivan, Pompano Beach, FL (US)

(73) Assignee: Mark D. Sullivan, Pompano Beach, FL (US)

( * ) Notice: Subject to any disclaimer, the term of this patent is extended or adjusted under 35 U.S.C. 154(b) by 185 days.

(21) Appl. No.: 13/941,460

(22) Filed: Jul. 13, 2013

(65) Prior Publication Data

US 2014/0093320 A1  Apr. 3, 2014

Related U.S. Application Data

(60) Provisional application No. 61/707,431, filed on Sep. 28, 2012.

(51) Int. Cl.
*B23Q 11/00* (2006.01)
*B25F 3/00* (2006.01)

(52) U.S. Cl.
CPC ............ *B23Q 11/0046* (2013.01); *B25F 3/00* (2013.01); *B23B 2270/62* (2013.01);
(Continued)

(58) Field of Classification Search
CPC ............ B23B 2270/30; B23B 2270/62; B23B 2260/058; B23B 47/34; B23Q 11/0046;
(Continued)

(56) References Cited

U.S. PATENT DOCUMENTS 2,144,586 A * 1/1939 Kelley .................... E21B 21/07
                                                  16/35 R
3,490,779 A * 1/1970 Bixby ............................ 279/96
(Continued)

FOREIGN PATENT DOCUMENTS

DE         4435607 A1 *  4/1995  ............. B23Q 11/00
DE        19702053 A1 *  7/1998  ............... E21C 3/16
(Continued)

OTHER PUBLICATIONS

Translation DE102012200543 available at http://translationportal.epo.org/emtp/translate/?ACTION=description-retrieval&COUNTRY=DE&ENGINE=google&FORMAT=docdb&KIND=A1&LOCALE=en_EP&NUMBER=102012200543&OPS=ops.epo.org/3.1&SRCLANG=de&TRGLANG=en (last visisted May 2, 2016).*

*Primary Examiner* — Daniel Howell
*Assistant Examiner* — Ryan Rufo
(74) *Attorney, Agent, or Firm* — The Concept Law Group, P.A.; Scott D. Smiley; Erin A. Martin

(57) ABSTRACT

Hammer drills and similar devices have an ongoing dust and debris problem that is solved by a protector device covering the drill in a main body protector shielding a user from the materials. The protector device has an evacuation region on its underside with multi dimensional adapters for attaching hoses of varying sizes. Additionally, an insertable collapsible accordion cylinder assists in covering the debris falling from different size drills being used. A second embodiment has a circular saw dust protector attachment arranged as two half moons or ¼ moon and ¾ moon having a central cylinder at their respective tops that are to be held together with a mechanical latch.

4 Claims, 4 Drawing Sheets

(52) U.S. Cl.
CPC ............ *Y02P 70/171* (2015.11); *Y10T 408/50* (2015.01); *Y10T 409/304088* (2015.01)

(58) Field of Classification Search
CPC ............. B23Q 11/0071; B23C 2230/00; A47L 7/0095; Y10T 408/50; Y10T 409/304088
USPC ............................................ 408/67; 409/137
See application file for complete search history.

(56) References Cited

U.S. PATENT DOCUMENTS

| | | | | |
|---|---|---|---|---|
| 4,209,069 A * | 6/1980 | Smith | ............................. | 173/75 |
| 5,292,210 A * | 3/1994 | Nowick | ............. | B23B 51/0426 408/204 |
| 5,356,245 A * | 10/1994 | Hosoi | .................... | B08B 15/04 408/56 |
| 6,193,448 B1 * | 2/2001 | Brennan | ............ | B23Q 11/0053 408/67 |
| 6,854,937 B1 * | 2/2005 | Weiss | ............................ | 409/137 |
| 7,350,824 B2 * | 4/2008 | Petner | ..................... | E03C 1/304 15/353 |
| 2005/0000052 A1 * | 1/2005 | Byles | ........................ | A47L 9/02 15/314 |
| 2006/0147284 A1 * | 7/2006 | Kim | ................................. | 408/68 |
| 2007/0065242 A1 * | 3/2007 | Skradski et al. | ................. | 408/67 |
| 2007/0261195 A1 * | 11/2007 | Bleicher | ................. | B08B 15/04 15/344 |
| 2007/0264091 A1 * | 11/2007 | Bleicher | ............ | B23Q 11/0046 408/58 |
| 2007/0264092 A1 * | 11/2007 | Kesten | ............................ | 408/67 |
| 2007/0292222 A1 * | 12/2007 | Colon | ............................ | 408/1 R |
| 2008/0283302 A1 * | 11/2008 | Larsson | .................. | E21B 21/01 175/209 |
| 2010/0155095 A1 * | 6/2010 | Furusawa | ........... | B23Q 11/0046 173/198 |
| 2011/0008118 A1 * | 1/2011 | Yoshikane et al. | .............. | 408/67 |

FOREIGN PATENT DOCUMENTS

| | | | | |
|---|---|---|---|---|
| DE | 102009054969 A1 * | 6/2011 | ......... | B23Q 11/0046 |
| DE | 102012200543 A1 * | 7/2013 | ......... | B23Q 11/0046 |
| EP | 1714735 A1 * | 10/2006 | ............ | B23Q 11/00 |
| GB | 1564852 A * | 4/1980 | ............ | B23Q 11/08 |
| JP | 08-071885 A * | 3/1996 | ............ | B23Q 11/00 |
| JP | 2001-259960 A * | 9/2001 | ............ | B23Q 11/08 |
| JP | 2011-005843 A * | 1/2011 | ............... | B28D 7/02 |
| WO | WO 95/20440 A1 * | 8/1995 | ............ | B08B 15/04 |
| WO | WO 2005/025792 A1 * | 3/2005 | ............ | B23B 45/00 |

* cited by examiner

DUST FREE DRILL SYSTEM

CROSS REFERENCE TO RELATED APPLICATIONS

This application claims benefit of previously filed provisional patent application 61/707,431 filed on Sep. 28, 2012.

FIELD OF THE INVENTION

This invention relates to devices to shield a construction device. More particularly, the invention relates to an attachment device that concentrates debris, chips and dust produced from a drilling device and deposits it into a secure collection machine in order to avoid polluting the surrounding environment.

BACKGROUND OF THE INVENTION

A hammer drill is known by various other names such as a rotary hammer, roto-drill or hammering drill. This type of drill has a rotary action interacting with a hammering action. The hammering action provides a hammer strike that quickly pulverizes a brittle surface and permits faster drilling with less effort. These drills are typically electric or battery powered, whilst larger units use electro-pneumatic technology to provide sufficient power.

Another type of drill is called a hole saw with a mandrel; it has a central rod with a central circle arranged perpendicularly to the rod; at the edge of this central circle is the main cutting device of the drill. As its name implies, the hole saw uses a circularly arranged set of teeth to cut out a circular shape in a ceiling or other structure. Once opened, these orifices can serve for the hanging of lights or other useful devices.

These type of drills when used on concrete structures or similar surfaces generate a great deal of dust and chips filling the surrounding work area with a cloud of debris. This byproduct of a simple construction procedure can severely impact the workspace environment leading to a laborious cleanup. Additionally, persons or animals nearby his type of drill can inhale this material as it lingers in the air about the drill.

Accordingly, these is a need to overcome the aforementioned deficiencies.

SUMMARY OF THE INVENTION

A drill attachment device comprising: a bottom vacuum attachment portion integral with a main protector portion having a cylindrical neck on one side and a larger cavity on the opposite side.

In another aspect, wherein the bottom vacuum attachment portion further comprises a first cylinder attached at one end to a central portion of an annulus attached to inner sides of main protector portion.

In another aspect, wherein the bottom vacuum attachment portion further comprises a second larger cylinder concentrically located about the first cylinder.

In another aspect, further comprising: a dorsal protrusion.

In another aspect, further comprising: a cylindrical device attached atop the dorsal protrusion.

In another aspect, wherein the cylindrical device attached atop the dorsal protrusion has two open ends and a central longitudinal cavity.

In another aspect, further comprising: a collapsible cylinder inserted within the cylindrical neck on one side.

In another aspect, wherein the collapsible cylinder has an accordion portion.

In another aspect, wherein the collapsible cylinder has a straight portion.

The drill dust protection system comprising: a dust evacuation portion attached at a bottom of a main body wherein the main body has a cavity on one side and a bottle shaped neck on the opposite side.

In another aspect, further comprising: a collapsible insert.

In another aspect, wherein the collapsible insert further comprises: an accordion like section.

In another aspect, wherein the collapsible insert further comprises: a cylindrical insertion section.

In another aspect, further comprising: a top mounted protrusion.

In another aspect, wherein the top mounted protrusion has a cylinder integrated with the top mounted protrusion.

In another aspect, wherein the evacuation portion further comprises two concentric cylinders.

In another aspect, a circular saw attachment device comprising:
a first device having
a first central half cylinder attached at the top of the first device and
a first portion of a latch attached to the first central half cylinder.

In another aspect, wherein the first device is a half moon shape or semicircular shape.

In another aspect, a second device having
a second central half cylinder attached at the top of the second device and
a second portion of a latch attached to the second central half cylinder.

In another aspect, wherein the first and second device are held together by the first and second portions of the latch on the first and second half cylinders respectively.

These and other aspects, features, and advantages of the present invention will become more readily apparent from the attached drawings and the detailed description of the preferred embodiments, which follow.

BRIEF DESCRIPTION OF THE DRAWINGS

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
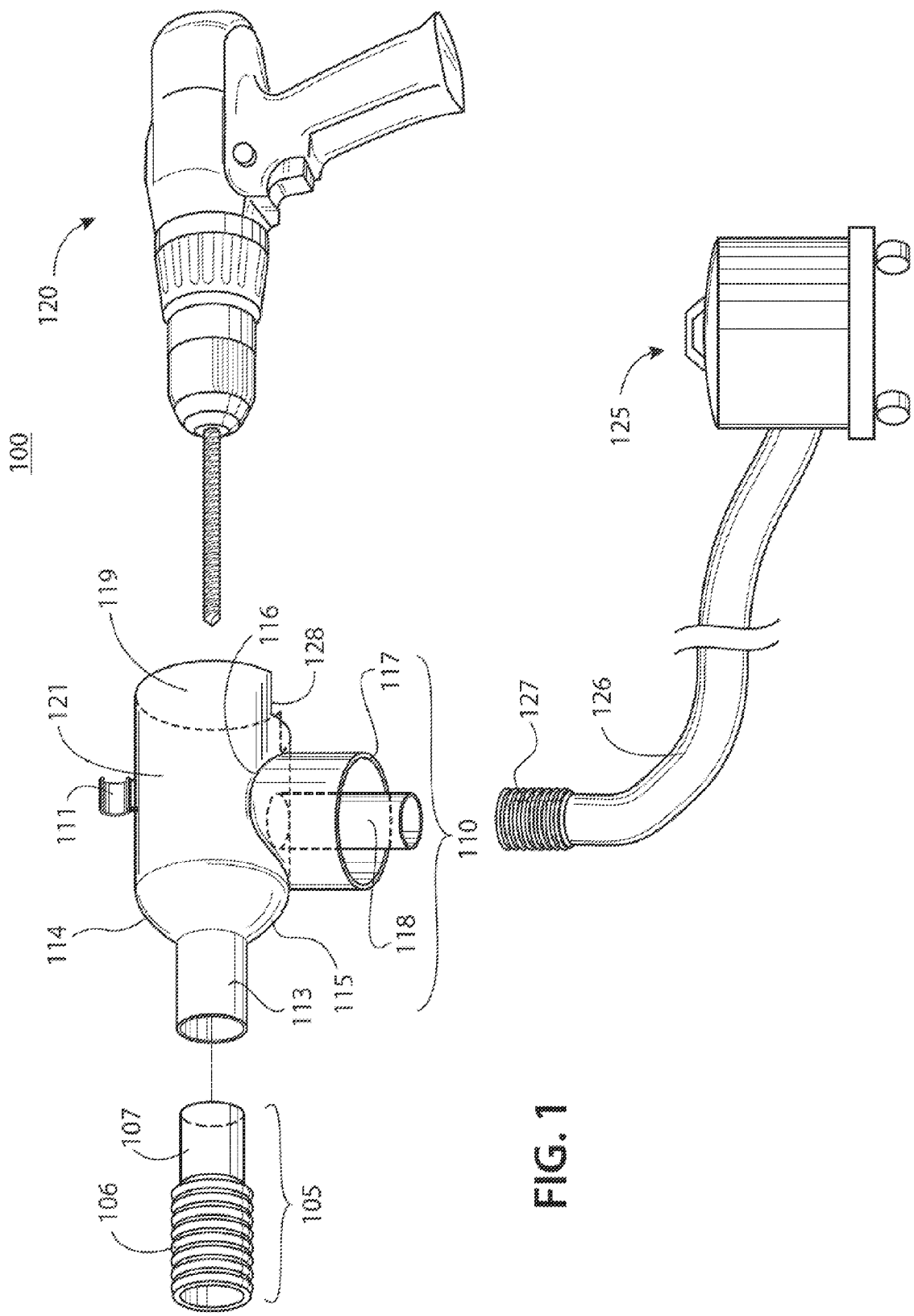
FIG. 1 illustrates a disassembled front view of the various components comprising the Dust Free attachment System and Device.

The Dust Free Drill Attachment System and Device 100 is shown disassembled in FIG. 1. The system comprises several components including: a collapsible cylinder 105, a contoured dust protector 110, a drilling machine 120, and a vacuum device 125 connected by a hose 126 with ribs 127. A drilling device 120 such as a hammer drill is brought into the orifice 119 on the right side of the dust protector 110. The drill bit attached to the drill is placed through a circular opening on the left hand side extended cylinder 113. From there the drill bit enters the cavity in the center of the collapsible cylinder 105 that has been placed in the extended cylinder 113 and out through the collapsible end 106 of the cylinder 105.

The collapsible cylinder 105 has a straight cylinder portion 107 and a collapsible accordion style portion 106 that have been integrated together as one plastic component. The collapsible portion 106 of collapsible cylinder 105 may be enlarged to cover varying sizes of drill bits and shrunken to cover smaller bits. The straight cylinder portion 107 of the collapsible cylinder 105 is inserted into the circular opening of the extended cylinder 113 and held there by physical contact of the two parts. The collapsible cylinder 105 is an optional component and depending upon the size of the drill it can used if necessary or set aside if not necessary. Thus, when a user begins to create chips, debris and dust, these can be caught in the dust protector 110 and or the optional collapsible cylinder 105 and sent through the hose 126 to the vacuum unit 125 attached to the hose 126 at the bottom of the dust protector 110.

The Dust Free Attachment Device itself comprises the collapsible cylinder 105 and the contoured dust protector 110. As discussed above, the hose 126 is attached at the bottom of the dust protector 110 that provides three possible attachment points and sizes. These attachment points are formed from a circular contour 116 at the bottom portion of the dust protector 110 that extends downwards from the main portion of the dust protector 121 forming a cylinder 117 having a second one 118 there within; thus, two cylindrical protrusions extend downwards from the main body 121 of the dust protector.

The inner circumference of cylindrical protrusion 117 forms one attachment point and size; the outer circumference of cylindrical protrusion 118 forms a second attachment point and size whilst the inner circumference of cylindrical protrusion 118 forms a third attachment point and size. In this manner, various hoses can be attached to the dust protector providing manufacturer flexibility. It can be readily appreciated that the only entry point into the main portion 121 of the dust protector 110 is through the cylinder 118 as having an opening for materials between the cylinders 117 and 118 would permit the flow of materials into the environment in the event that a smaller hose is used.

Thus, there is an annulus shaped portion forming the bottom of the inner portion of the dust protector 110. The hole in this annulus is for the attachment at the inner edges of the annulus circumference to cylinder 118. The circular exterior portion of this annulus meets the inside of contour material 116 and the bottom of the side-laying rest of the dust protector 110 that is shaped in a laying-wine bottle type configuration. The left side of the dust protector has the neck shape cylinder 113 of the wine bottle that integrates with two conical shaped surfaces 114, 115 that form a top and bottom integral surface making the front sides of the bottle shape. These slowly extend backwards making the main body of the dust protector into a long cylindrical shape 121 that meets the bottom cylindrical portion 117 at contour line 116. At the back end of the dust protector 110 is an orifice 121 such that a drill can be inserted therethrough.

Finally, a curved light flash attachment 111 extends upwards above the thickest portion of the bottle shape. This is integrally connected with the rest of the body of the wine bottle shape; a small flat vertical portion is integrally connected with a semicircular portion forming the body of the flashlight attachment 111. This half circular portion 111 forms an attachment or holding point for a flashlight or similar device. Finally, item illustrates a front view showing a collapsible cylinder 105 and a dust free protector 110 housing a drill that has been inserted therein.

A more particular implementation is described as follows. Generally the Dust-Free Drill Attachment (DFDA), as disclosed herein, provides people with an easy and safe way to capture dust and debris while drilling, sawing and or chipping. This innovative product can comprise a set of standard drill attachment parts, hole saw attachment parts, and hammer drill attachment parts. The standard drill attachment parts can include different collapsible tube length 114" connection tube for a vacuum hose, and two collapsible tubes. The hole saw attachment parts can include two pieces ¾ clear articulating half bucket-shaped pieces of rigid plastic in 3 sizes, 2½", 4½", and 6¾": 1¼" vacuum tube stemming from the bottom of the bucket"; and the two halves 340 snap together around item 113. The hammer drill attachment parts may include the collapsible tubes in different lengths. These fittings can attach to the main body which attaches to all leading manufacturers' drills or chipping hammers. Once attached to the desired tool, people may then attach the opposite end to any standard wet/dry vacuum. These attachments do not impede on any of the drills mechanics, allowing the user access to the drill's gear reduction function whenever necessary. The exact specifications may vary upon manufacturing.

Figure 2:
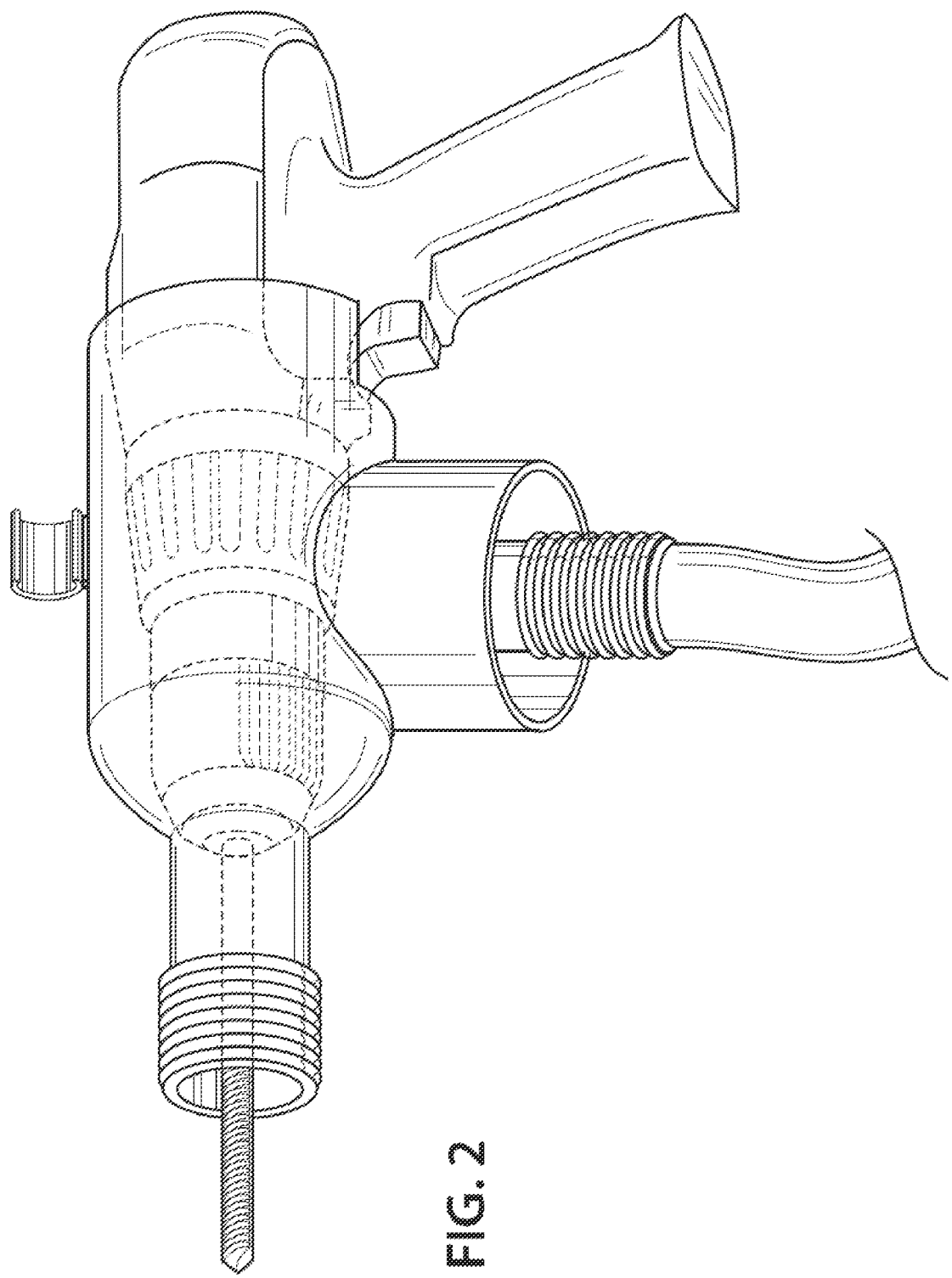
FIG. 2 illustrates a front view of the Dust Free attachment System and Device showing a collapsible cylinder and a dust free protector housing a drill that has been inserted therein.

FIG. 2 illustrates a front view of the Dust Free attachment System and Device showing a collapsible cylinder and a dust free protector housing a drill that has been inserted therein. In this view a completed system view is presented having the drill, dust free protector and collapsible cylinder inserted in the front therein.

Figure 3:
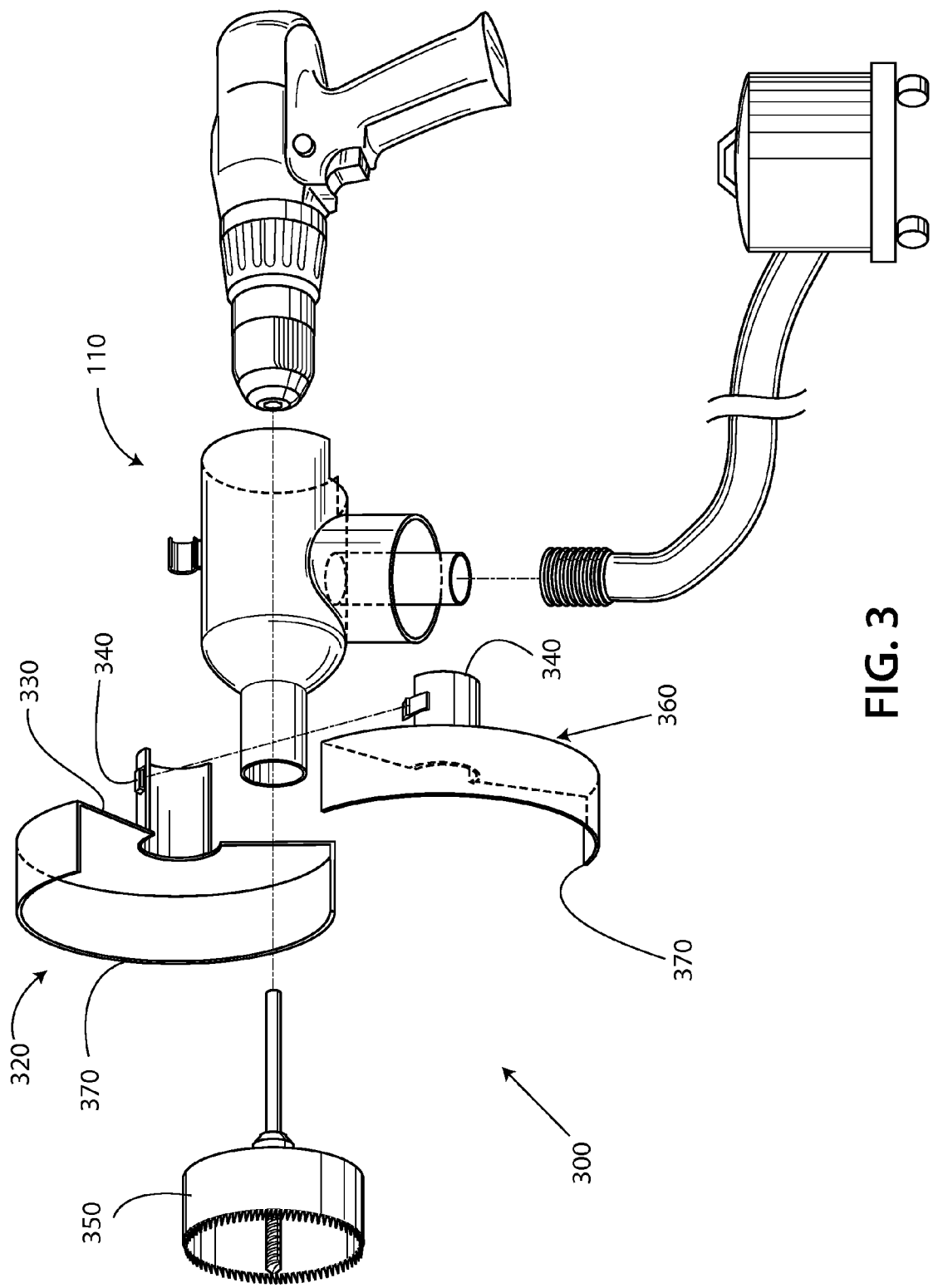
FIG. 3 illustrates a front view of the Dust Free attachment System and Device showing a circular hole saw secondary attachment.
Figure 4:
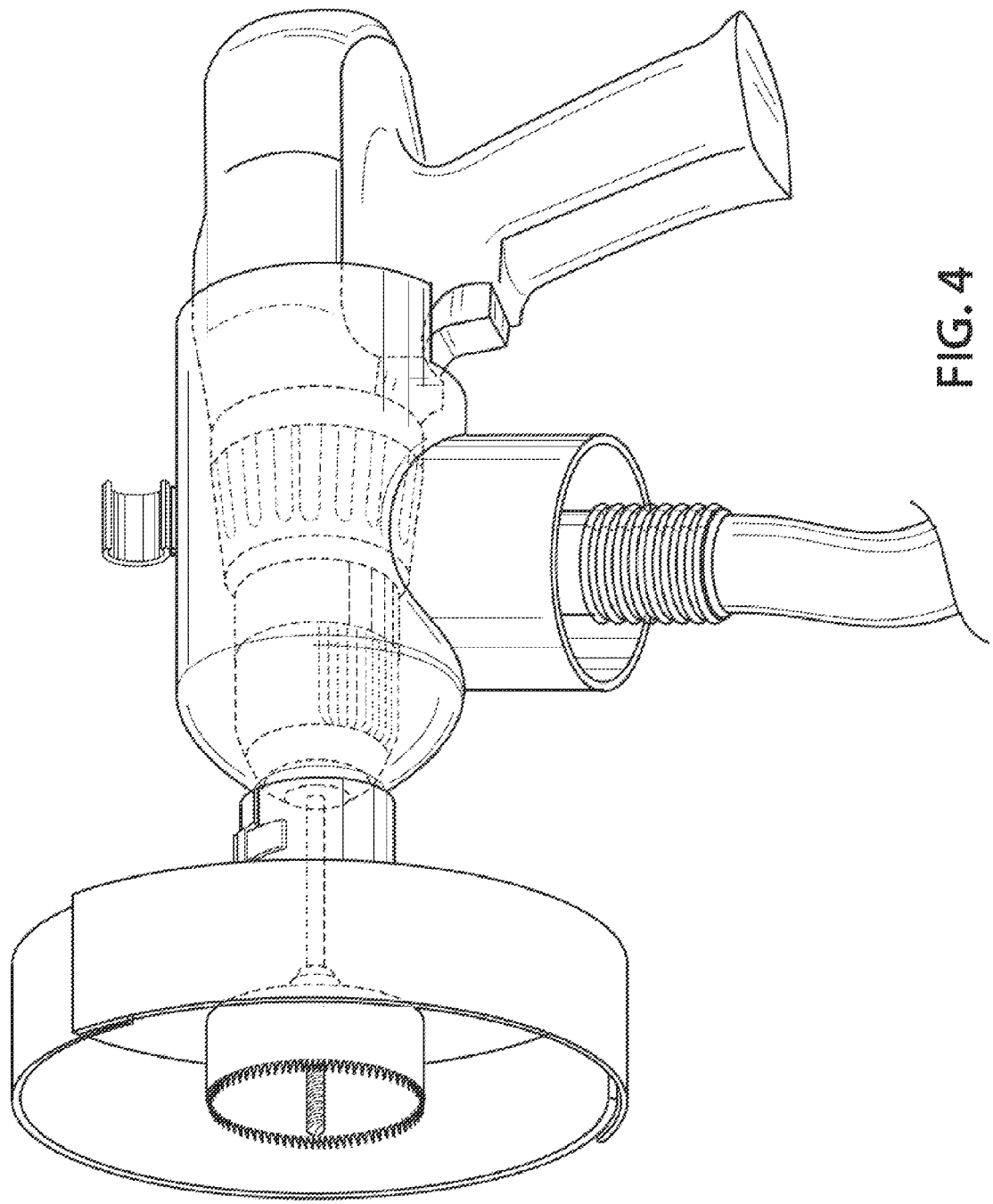
FIG. 4 illustrates a front view of the Dust Free attachment System and Device showing a circular hole saw secondary attachment and a dust free protector housing a drill that has been inserted therein.

A second embodiment is shown in FIGS. 3-4. There is shown a drill, a vacuum attached to a dust protector 110 having a circular saw dust protector secondary attachment 300; the drill has a circular saw 350 connected through the secondary dust protector attachment 300 and on through the primary dust protector 110 and on to the drill. The secondary dust protector 300 is made from two components, namely, a first half moon 320 and a second half moon 360; alternatively, a ¼ and ¾ moon concept. The two of these are held together by a tension, draw, straight loop latch or similar device 340. This latch's 340 two components are each adhesively attached externally to respective half central cylinders 340 made from plastic such as pvc; these half cylinders are larger then the extended cylinder 113 in the primary dust protector 110. They provide a convenient pathway for the drill rod to extend through and permit the circular saw 350 to sit within secondary dust protector 300 in between the half moons 320, 360. Each half moon has a top portion 330 that is integral with the bottom of the cylinder halves 340 and parallel to the circular shaped cavity therein; they also have a perpendicular portion 370 extending leftwards in the figure that forms a shield wall running circularly at the edge of the half moons 320, 360.

Finally, it should be apparent that the device is entirely made of suitable plastic materials or similar materials. The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed, but that the invention will include all the embodiments falling within the scope of the appended claims.

What is claimed is:

1. A vacuum attachment device for a handheld power tool comprising:
    a main protector portion including:
        a hollow body having a first end, a second end, and an outer peripheral surface extending therebetween, the outer peripheral surface including:
            a cylindrical neck portion of a first outside diameter extending from the first end of the hollow body, the cylindrical neck portion defining a first aperture at the first end of the hollow body;
            a cylindrical main portion of a second outside diameter extending from the second end of the hollow body, the cylindrical main portion defining a second aperture at the second end of the hollow body, the second aperture being sized and shaped to receive a portion of a handheld power tool therein, the second outside diameter being larger than the first outside diameter; and
            a portion extending between, and connecting, the cylindrical neck portion and the cylindrical main portion;
    a dust evacuation port protruding from the cylindrical main portion, the dust evacuation port including:
        a first cylinder coupled to the cylindrical main portion, the first cylinder having a first inner circumference defining a first vacuum attachment point; and
        a second cylinder surrounded by, and in a non-contiguous relationship with, the first cylinder, the second cylinder having a second inner circumference smaller than the first inner circumference, the second inner circumference defining a second vacuum attachment point and defining a dust flow path from the second vacuum attachment point to the first aperture defined by the cylindrical neck portion; and
    a saw attachment device mounted on the cylindrical neck portion, the saw attachment device including:
        a first saw protector portion and a second saw protector portion, each saw protector portion including:
            a first half cylinder having a first diameter and a second half cylinder having a second diameter, the second diameter larger than the first diameter of the first half cylinder; and
            a fastener coupled to the first half cylinder for connecting the two saw protector portions.

2. The vacuum attachment device of claim 1, wherein the saw attachment device is removable.

3. The vacuum attachment device of claim 2, wherein the saw attachment device is capable of being replaced with a collapsible insert for a drilling operation.

4. The vacuum attachment device of claim 2, wherein the cylindrical neck portion is capable of receiving a collapsible insert for a drilling operation.

* * * * *